(12) United States Patent
Tsai

(10) Patent No.: US 12,405,282 B2
(45) Date of Patent: Sep. 2, 2025

(54) APPARATUS FOR DETECTING DEFECTS OF REFLECTIVE ELEMENT

(71) Applicant: Hong-I Tsai, Taoyuan (TW)

(72) Inventor: Hong-I Tsai, Taoyuan (TW)

(73) Assignee: Taiwan Nano-Technology Application Corp, Taoyuan (TW)

( * ) Notice: Subject to any disclaimer, the term of this patent is extended or adjusted under 35 U.S.C. 154(b) by 188 days.

(21) Appl. No.: 18/386,616

(22) Filed: Nov. 3, 2023

(65) Prior Publication Data

US 2024/0103026 A1    Mar. 28, 2024

(51) Int. Cl.
*G01N 21/88*   (2006.01)
*G01N 21/95*   (2006.01)
*G01N 35/00*   (2006.01)

(52) U.S. Cl.
CPC ..... *G01N 35/0099* (2013.01); *G01N 21/8851* (2013.01); *G01N 21/95* (2013.01); *G01N 2021/9511* (2013.01)

(58) Field of Classification Search
CPC .......... G01N 21/8806; G01N 21/8851; G01N 21/95; G01N 2021/845; G01N 2021/9511
See application file for complete search history.

(56) References Cited

U.S. PATENT DOCUMENTS 10,937,683 B1 *   3/2021   Schlezinger ...... H01L 21/67715
2021/0018367 A1 *  1/2021   Oguchi ................. G01J 3/0205

* cited by examiner

*Primary Examiner* — Kevin K Pyo

(57) ABSTRACT

An apparatus for detecting defects includes a first conveyor for transporting finished reflective elements; a 3D inspection zone including a second conveyor, a first robot for picking one reflective element and placing same on the second conveyor, two side-lit panels at either side of the second conveyor, and two first digital cameras each between the side-lit panels of the same side for taking 3D images of the reflective element and sending same to an image processor for detecting defects; a 2D inspection zone including a third conveyor for receiving the reflective element, a backlit panel at either side of the third conveyor, and two second digital cameras for taking 2D images of the reflective element and sending same to the image processor for detecting defects. There are further provided a microcontroller, a fourth conveyor, a fifth conveyor, and a second robot.

1 Claim, 2 Drawing Sheets

APPARATUS FOR DETECTING DEFECTS OF REFLECTIVE ELEMENT

BACKGROUND OF THE INVENTION

1. Field of the Invention

The invention relates to detecting apparatuses and more particularly to an apparatus for detecting defects of a reflective element in a manufacturing process of an interior rearview mirror for a vehicle.

2. Description of Related Art

Typically, an employee may visually inspect a slightly convex surface of a randomly selected finished reflective element for defects (e.g., scratches, blobs and notches) in a manufacturing process of an interior rearview mirror for a vehicle. The passed reflective element will be mounted on a casing of the interior rearview mirror.

However, the manual inspection is time consuming, labor intensive and unreliable.

Thus, the need for improvement still exists.

SUMMARY OF THE INVENTION

It is therefore one object of the invention to provide an apparatus for detecting defects of a reflective element comprising an apparatus for detecting defects, comprising a first conveyor for transporting a plurality of finished reflective elements; an image processor; a 3D inspection zone including a second conveyor disposed rearward of the first conveyor, a first robot for picking one of the finished reflective elements and placing same on the second conveyor, two spaced side-lit panels at either side of the second conveyor, and two first CCD-based digital cameras each disposed between the side-lit panels of the same side for taking 3D images of the finished reflective element moving on the second conveyor and sending the 3D images to the image processor for detecting defects of the finished reflective element; a 2D inspection zone including a third conveyor disposed rearward of the second conveyor for receiving the finished reflective element from the second conveyor, a backlit panel at either side of the third conveyor, and two second CCD-based digital cameras each disposed above the backlit panel for taking 2D images of the finished reflective element moving on the third conveyor and sending the 2D images to the image processor for detecting defects of the finished reflective element; a microcontroller for receiving data of the detected defects of the finished reflective element from the image processor and determining whether the finished reflective element has defects or not; a fourth conveyor disposed rearward of the third conveyor; a fifth conveyor disposed rearward of the third conveyor and being parallel to the fourth conveyor; and a second robot controlled by the microcontroller for picking the finished reflective element moving on the third conveyor and either placing same on the fourth conveyor if the finished reflective element is defect free or placing same on the fifth conveyor if the finished reflective element has defects.

The above and other objects, features and advantages of the invention will become apparent from the following detailed description taken with the accompanying drawings.

DETAILED DESCRIPTION OF THE INVENTION

Figure 1:
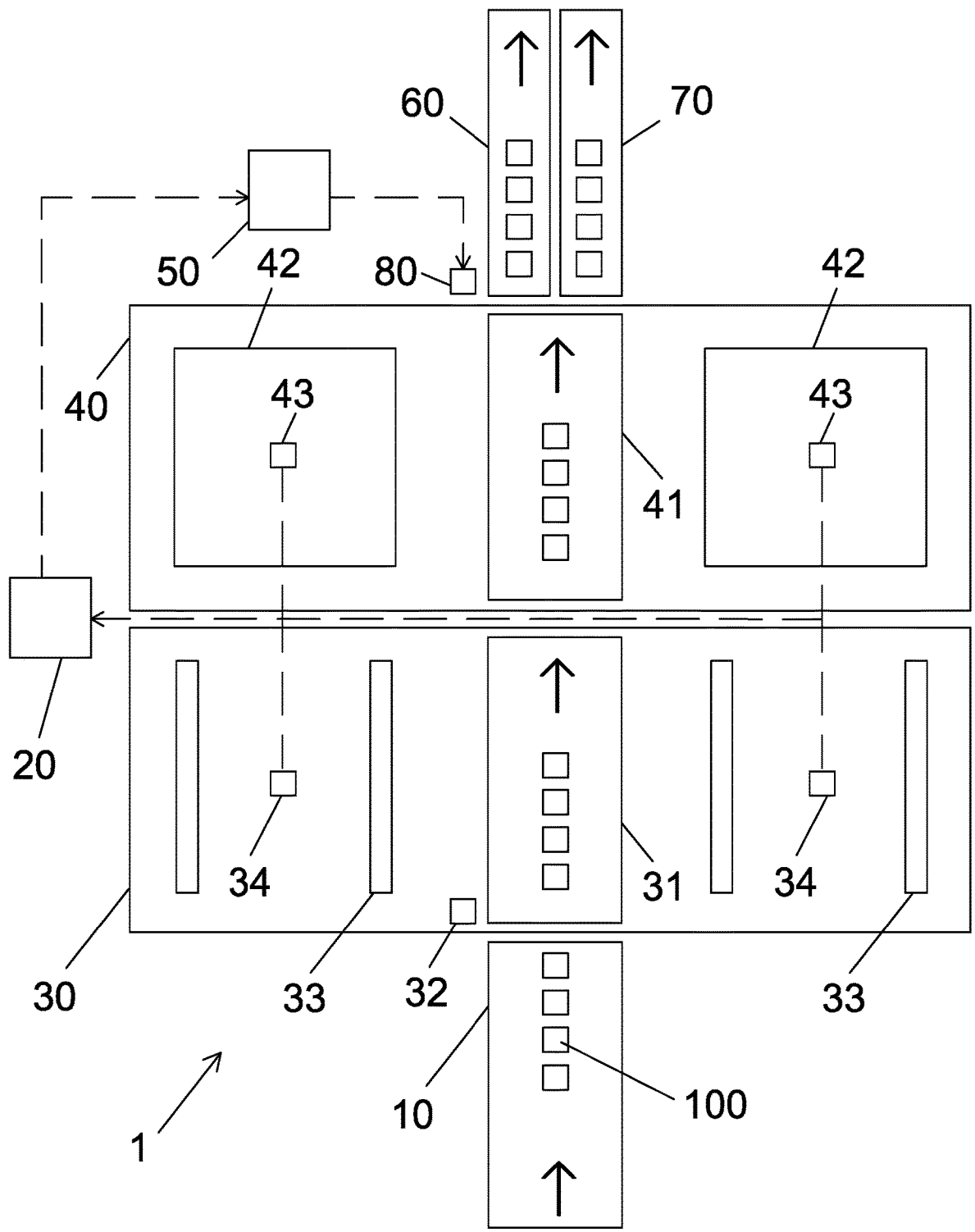
FIG. 1 is a schematic top plan view of an apparatus for detecting defects of a reflective element in a manufacturing process of an interior rearview mirror for a vehicle according to the invention.
Figure 2:
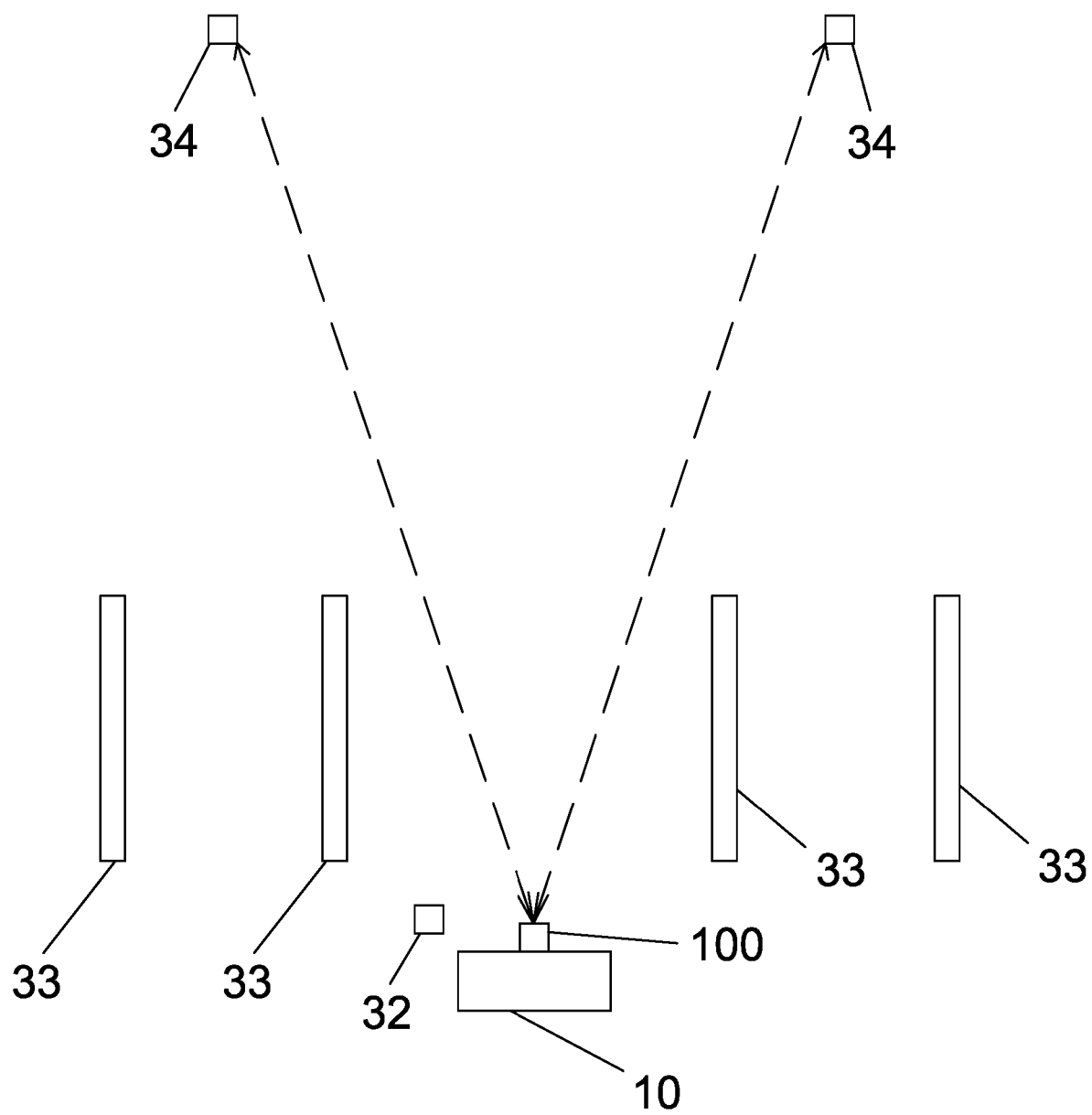
FIG. 2 is a schematic front elevation view of FIG. 1.

Referring to FIGS. 1 to 2, an apparatus 1 for detecting defects of a reflective element in a manufacturing process of an interior rearview mirror for a vehicle in accordance with the invention comprises a first conveyor 10 for transporting a plurality of finished reflective elements 100; an image processor 20; a three-dimensional (3D) inspection zone 30 including a second conveyor 31 disposed rearward of the first conveyor 10, a first robot (e.g., manipulating industrial robot) 32 for picking the finished reflective element 100 and placing same on the second conveyor 31, two spaced side-lit panels 33 at either side of the second conveyor 31, and two first charge-coupled device (CCD)-based digital cameras 34 each disposed between the side-lit panels 33 of the same side for taking 3D images of the finished reflective element 100 moving on the second conveyor 31 and sending the 3D images to the image processor 20 for detecting defects (e.g., scratches, blobs and notches) of the finished reflective element 100; a two-dimensional (2D) inspection zone 40 including a third conveyor 41 disposed rearward of the second conveyor 31 for receiving the finished reflective element 100 from the second conveyor 31, a backlit panel 42 at either side of the third conveyor 41, and two second CCD-based digital cameras 43 each disposed above the backlit panel 42 for taking 2D images of the finished reflective element 100 moving on the third conveyor 41 and sending the 2D images to the image processor 20 for detecting defects (e.g., scratches, blobs and notches) of the finished reflective element 100; a microcontroller 50 for receiving data of the detected defects of the finished reflective element 100 from the image processor 20 and determining whether the finished reflective element 100 has defects or not; a fourth conveyor 60 disposed rearward of the third conveyor 41; a fifth conveyor 70 disposed rearward of the third conveyor 41 and being parallel to the fourth conveyor 60; and a second robot 80 controlled by the microcontroller 50 for picking the finished reflective element 100 moving on the third conveyor 41 and either placing same on the fourth conveyor 60 if the finished reflective element 100 is defect free or placing same on the fifth conveyor 70 if the finished reflective element 100 has defects.

Preferably, the image processor 20 performs a defect detection program on the 2D and 3D images to detect defects (e.g., scratches, blobs and notches) of the finished reflective element 100.

Preferably, each of the fourth conveyor 60 and the fifth conveyor 70 transport the inspected finished reflective element 100 to a receptacle.

While the invention has been described in terms of preferred embodiments, those skilled in the art will recognize that the invention can be practiced with modifications within the spirit and scope of the appended claims.

What is claimed is:

1. An apparatus for detecting defects, comprising:
a first conveyor for transporting a plurality of finished reflective elements;
an image processor;
a 3D inspection zone including a second conveyor disposed rearward of the first conveyor, a first robot for picking one of the finished reflective elements and placing same on the second conveyor, two spaced side-lit panels at either side of the second conveyor, and two first CCD-based digital cameras each disposed between the side-lit panels of the same side for taking 3D images of the finished reflective element moving on the second conveyor and sending the 3D images to the image processor for detecting defects of the finished reflective element;

a 2D inspection zone including a third conveyor disposed rearward of the second conveyor for receiving the finished reflective element from the second conveyor, a backlit panel at either side of the third conveyor, and two second CCD-based digital cameras each disposed above the backlit panel for taking 2D images of the finished reflective element moving on the third conveyor and sending the 2D images to the image processor for detecting defects of the finished reflective element;

a microcontroller for receiving data of the detected defects of the finished reflective element from the image processor and determining whether the finished reflective element has defects or not;

a fourth conveyor disposed rearward of the third conveyor;

a fifth conveyor disposed rearward of the third conveyor and being parallel to the fourth conveyor; and a second robot controlled by the microcontroller for picking the finished reflective element moving on the third conveyor and either placing same on the fourth conveyor if the finished reflective element is defect free or placing same on the fifth conveyor if the finished reflective element has defects.

* * * * *